United States Patent
Smague

(10) Patent No.: US 9,605,618 B2
(45) Date of Patent: Mar. 28, 2017

(54) METHOD FOR AUTOMATICALLY STOPPING AN INTERNAL COMBUSTION ENGINE USING AN AUTOMATIC STOP-START SYSTEM

(75) Inventor: Pascal Smague, Rueil Malmaison (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 670 days.

(21) Appl. No.: 13/996,218

(22) PCT Filed: Dec. 16, 2011

(86) PCT No.: PCT/FR2011/053028
§ 371 (c)(1),
(2), (4) Date: Sep. 12, 2013

(87) PCT Pub. No.: WO2012/085414
PCT Pub. Date: Jun. 28, 2012

(65) Prior Publication Data
US 2014/0088854 A1    Mar. 27, 2014

(30) Foreign Application Priority Data

Dec. 20, 2010   (FR) ..................... 10 60855

(51) Int. Cl.
*F02D 45/00*    (2006.01)
*F02N 11/08*    (2006.01)

(52) U.S. Cl.
CPC ............ *F02D 45/00* (2013.01); *F02N 11/084* (2013.01); *F02D 2200/502* (2013.01);
(Continued)

(58) Field of Classification Search
CPC .. F02D 45/00; F02D 2200/502; F02N 11/084; F02N 2200/0801; F02N 2200/0804;
(Continued)

(56) References Cited

U.S. PATENT DOCUMENTS 6,526,931 B1 *   3/2003   Vilou ................. F02N 11/0825
                                                 123/179.4
7,610,891 B2 *   11/2009  Seufert .................. B60K 6/387
                                                 123/179.25
(Continued)

FOREIGN PATENT DOCUMENTS

DE    10 2007 024352    11/2008
FR        2 937 091      4/2010
WO       2007 043342     4/2007

OTHER PUBLICATIONS

International Search Report Issued Nov. 8, 2012 in PCT/FR11/053028 Filed Dec. 16, 2011.
(Continued)

*Primary Examiner* — Joseph Dallo
(74) *Attorney, Agent, or Firm* — Oblon, McClelland, Maier & Neustadt, L.L.P.

(57) ABSTRACT

A method for operating an engine automatic stop-start system used in a motor vehicle fitted with an internal combustion engine. The system allows: automatic stoppings of the engine when a set of conditions outside and inside the vehicle are satisfied; automatic startings of the engine following an automatic stopping when at least one engine demand condition is met. The method includes an internal value which is a count of a number of operations of the system, wherein the internal value is subjected to a high threshold and to a low threshold, and the method can modify at least one of the conditions outside or inside the vehicle if the internal value reaches the low threshold or reaches the high threshold.

10 Claims, 2 Drawing Sheets

(52) U.S. Cl.
CPC ....... *F02N 11/0822* (2013.01); *F02N 11/0829* (2013.01); *F02N 2200/022* (2013.01); *F02N 2200/023* (2013.01); *F02N 2200/0801* (2013.01); *F02N 2200/0802* (2013.01); *F02N 2200/0804* (2013.01); *F02N 2200/0806* (2013.01); *F02N 2200/103* (2013.01); *F02N 2200/122* (2013.01); *F02N 2200/14* (2013.01); *Y02T 10/48* (2013.01)

(58) Field of Classification Search
CPC ............. F02N 2200/14; F02N 11/0822; F02N 2200/122; F02N 2200/103; F02N 2200/023; F02N 2200/022; F02N 11/0829; Y02T 10/48
USPC ............................................ 123/179.3, 179.4
See application file for complete search history.

(56) References Cited

U.S. PATENT DOCUMENTS

| | | | | |
|---|---|---|---|---|
| 8,275,534 B2* | 9/2012 | Berr | .................... | F02N 11/0814 123/179.3 |
| 8,596,248 B2* | 12/2013 | Eser | .................... | F02D 41/068 123/179.4 |
| 2002/0033157 A1* | 3/2002 | Thompson | .............. | F02D 17/04 123/179.4 |
| 2004/0153236 A1* | 8/2004 | Itoh | ........................ | B60K 6/485 701/113 |
| 2004/0194749 A1* | 10/2004 | Yonezawa | ................. | F01L 1/02 123/179.5 |
| 2004/0211381 A1* | 10/2004 | Ogawa | .................... | B60H 1/04 123/179.4 |
| 2005/0051125 A1* | 3/2005 | Braun | ...................... | B60K 6/48 123/179.3 |
| 2006/0016412 A1* | 1/2006 | Butcher | ................. | B60K 6/365 123/179.3 |
| 2006/0137643 A1* | 6/2006 | Thompson | .......... | F02N 11/0803 123/179.4 |
| 2007/0049456 A1* | 3/2007 | Shimizu | ................... | B60K 6/44 477/3 |
| 2009/0043429 A1 | 2/2009 | Minekawa | | |
| 2009/0063009 A1* | 3/2009 | Jinno | ..................... | B60H 1/004 701/102 |
| 2009/0198438 A1* | 8/2009 | Jinno | ....................... | B60H 1/04 701/110 |
| 2010/0000487 A1* | 1/2010 | Hoshino | ............... | F02D 35/025 123/179.4 |
| 2010/0152995 A1* | 6/2010 | Baumann | ........... | F02N 11/0814 701/112 |
| 2010/0174473 A1* | 7/2010 | Pursifull | ............... | F02D 41/042 701/112 |
| 2010/0180849 A1* | 7/2010 | Senda | ................. | F02N 11/0855 123/179.4 |
| 2010/0211298 A1* | 8/2010 | Martin | .................. | B60W 10/06 701/113 |
| 2010/0224157 A1* | 9/2010 | Mizuno | .............. | G01R 31/3662 123/179.4 |
| 2010/0229815 A1* | 9/2010 | Senda | ................. | F02N 11/0833 123/179.4 |
| 2010/0300781 A1* | 12/2010 | Leone | .................... | B60K 6/442 180/65.29 |

OTHER PUBLICATIONS

French Search Report Issued Jul. 14, 2011 in French Patent Application FR 1060855.

* cited by examiner

METHOD FOR AUTOMATICALLY STOPPING AN INTERNAL COMBUSTION ENGINE USING AN AUTOMATIC STOP-START SYSTEM

TECHNICAL FIELD TO WHICH THE INVENTION RELATES

The present invention relates to a method for stopping an internal combustion engine using an automatic engine stop-start system implemented in a motor vehicle. The invention relates mainly to the modifications of the operating range of the automatic engine stop-start system.

The invention also relates to an automatic engine stop-start system applying the method according to the invention.

DESCRIPTION OF THE PRIOR ART

Automatic stop-start systems for internal combustion engines are a solution in the motor-vehicle field to reduce carbon dioxide emissions in accordance with increasingly strict regulations. Patent FR2937091 describes the conditions for automatically stopping an internal combustion engine using an automatic stop-start system and the modes of operation of said system. Two types of conditions are described therein which are of the comfort type and of the safety type, and two modes of operation of said system that are called economic and standard. Said types of conditions summarize all the conventional conditions of stopping the engine that are applied by the automatic stop-start systems. The operating modes substantially modify said stopping conditions.

The conditions of the comfort type take account of all the elements of comfort for the passengers of the vehicle who are affected by a stopping of the engine by the automatic stop-start system, degrading the comfort of the passengers and able to cause a rejection of this type of system. One of the elements of comfort is for example the use of air conditioning. Depending on the outside temperature, during periods of great heat, the automatic stopping of the engine also stops the air conditioning and thereby substantially increases the temperature inside the vehicle, adversely affecting the comfort of the vehicle occupants. Similarly, during periods of great cold, the automatic stopping of the engine stops the heating system of the vehicle, adversely affecting the comfort of the vehicle occupants. It is then considered that the condition of comfort is fulfilled when the outside temperature is in a range between two threshold values of 15° C. to 30° C., since it is considered that the occupants of the vehicle are in a comfortable situation with respect to the temperature.

The conditions of the safety type take account of the elements that relate to the safety of the persons and of the engine such as for example the engine temperature. All these conditions must be fulfilled before the automatic engine stop-start system authorizes an automatic stopping of the engine. For example, if the engine-water temperature is too low, which may have an impact on the reliability of said engine, the stopping of the engine is not authorized by the system. It is considered that the condition of the safety type, with respect to the temperature of the engine, is fulfilled if this temperature is above a minimum threshold of 40° C.

Two operating modes of the automatic stop-start system are consequently described.

A first mode called economic mode authorizes the stopping of said engine when the conditions of safety type are fulfilled, the conditions of comfort type possibly not being fulfilled, in order to maximize fuel economy. For example, the engine may be stopped by the automatic stop-start system even when the outside temperature is below 10° C., causing discomfort for the occupants by depriving them of heating.

A second mode, called standard mode, preserves the elements of comfort and authorizes the stopping of the engine only if the conditions of safety type and of comfort type come together.

These automatic engine stop-start systems substantially increase the number of operations of the mechanical parts such as for example the engine starting system and therefore have a considerable impact on the reliability of said parts. These parts are designed for a limited number of uses and even though this number is increased in order to take account of the new requirements, they may break down before the end of life of the engine creating a possible point of failure of the vehicle. One of the consequences may then be that it is impossible to restart the engine, possibly following a stopping of the engine due to the operation of the automatic stop-start system.

SUBJECT OF THE INVENTION

One object of the invention is to alleviate this drawback and the subject of the invention is a pertinent use of the automatic stop-start system of the internal combustion engine.

The object of the invention is characterized more particularly by the introduction of an internal condition in the method of operation of said system in addition to the various stopping conditions external and internal to the vehicle, an internal condition which may modify the operation of the system.

The modification of the operation of the automatic engine stop-start system improves the longevity of said system and makes it possible to reduce the risks of creating new points of failure of the members of the engine.

Advantageously, this internal condition is based on a value which is incremented on each automatic start of the engine by the stop-start system.

This value may be the number of operations of said system. The counting of the operations makes it possible to predict risks of the engine not restarting, causing immobilizing failures.

Advantageously, the system is inhibited when a high threshold is exceeded of the value increasing with each start.

When this high threshold is reached, the automatic engine stop-start system is automatically inhibited, which allows only a manual operation of the engine starting system by the user, for example with an ignition key or equivalent device.

Advantageously, a low threshold of the number of operations of said system may be defined.

This low threshold announces the approach of the limits of operation of the system; also, in the event of this threshold being exceeded, the operating conditions are restricted in order to increase the longevity of operation of the system. The conditions for stopping the engine are then more strict and the engine is therefore stopped less frequently causing less action on the engine starting system.

According to the invention, the automatic stop-start system may comprise an engine-operation sensor, a gear-selector-position sensor, a clutch-pedal-position sensor, a vehicle-speed sensor, an electronic control unit and a device for counting the uses of the automatic engine stop-start system.

The automatic engine stop-start system comprises an electronic control unit which authorizes the automatic stopping of the engine if the stopping conditions are satisfied. These conditions originate from values read by the sensors and validated by control steps. A device for counting the uses or operations of said system is associated with the electronic control unit. The operation of said system is modified when the various thresholds of the number of operations are reached.

According to one embodiment, the electronic control unit authorizes an operation of the automatic stop-start system when the outside temperature is in a defined range of values as has already been evoked.

The registering of the outside temperature included in a range of values removes the automatic stoppings of the engine when the weather is too hot or too cold to maintain the comfort of the passengers.

Advantageously, the electronic control unit of the automatic stop-start system authorizes a stopping of the engine according to a minimum threshold of the engine-water temperature.

"Cold" starts of the engine are harmful to the reliability of the engine. It is preferable to wait until the engine has reached temperature before authorizing the operation of the automatic engine stop-start system.

Advantageously, the electronic control unit increases the minimum engine-water-temperature threshold when the low threshold of the number of operations of said system is reached.

An increase in the engine-water-temperature threshold registered by the automatic engine stop-start system has the effect of spacing out the operations of said system and hence reducing the starts of the engine.

According to one embodiment, the automatic stop-start system comprises a time-delay element and the electronic control unit increases the duration of time delay when the low threshold of use of said system is reached.

The time-delay element is used to reduce the number of inappropriate automatic stops of the engine when the various external and internal stopping conditions come together. The increase in the time-delay duration registered by the automatic engine stop-start system has the effect of reducing the automatic stops of the engine by said system also causing a reduction in the actions of the starting system.

Other advantages and features of the invention will become apparent on reading the following description given only as a nonlimiting example, and made with reference to the appended drawings.

DESCRIPTION OF THE EMBODIMENTS OF THE INVENTION

The automatic engine stop-start system 1 comprises measurement and control means which upload information to an electronic control unit 10. This control unit 10 knows all the conditions to be satisfied before authorizing an automatic stop of the engine. According to a proposed exemplary embodiment, the conditions for stopping the engine are as follows:
the engine is operating,
the vehicle has stopped, this stop is noted by:
the gear engaged is "neutral", that is to say for vehicles with a manual gearbox, the gear selector is in the "neutral" position and the clutch pedal is in the "engaged" position, or for vehicles with an automatic gearbox, the selection of "neutral",
the speed of the vehicle is below a threshold of 4 km/h,
the engine-water temperature is above 40° C.,
the outside-air temperature is below 30° C.,
the outside-air temperature is above 10° C.,
the above conditions are validated for a period of 5 s.

The automatic stop-start system 1 also authorizes starts of the engine following a stop authorized by said system 1. Specifically, following a stop of the engine authorized by said system, the same engine will be restarted if the vehicle driver carries out an operation to set the vehicle in motion, an operation which may be a change of gear, from the "neutral" position to another gear for vehicles with a mechanical gearbox or from the "neutral" position to "forward" or "reverse" for vehicles with an automatic gearbox, or a pressing of the accelerator pedal, without having to turn the engine ignition key. The stopping and starting of the engine with the ignition key are manual actions which always remain possible throughout the service life of the engine. They are well known and do not feature in this description.

The systems for starting the engine are designed with a number of operations estimated at 300 000 for a private vehicle and 400 000 for a utility vehicle. The number of manual starts executed by means of the ignition key is of the order of 60 000 throughout the service life of the engine. The difference (240 000 or 340 000) can then be carried out by the automatic stop-start system. Beyond these thresholds, the automatic stop-start system is disabled. These values form the high threshold for the number of operations of the automatic engine stop-start system. Also defined is a low threshold of use fixed at 200 000 for private vehicles and at 290 000 for utility vehicles, low thresholds beyond which the operation of the automatic stop-start system is modified. These values are given as an example. More precise values are established for each type of vehicle depending on its use: for example, a utility vehicle is regularly subjected to a substantially greater number of stops and restarts than a private vehicle, and the same applies for a "city" vehicle compared with an "open-road" four-door sedan.

Figure 1:
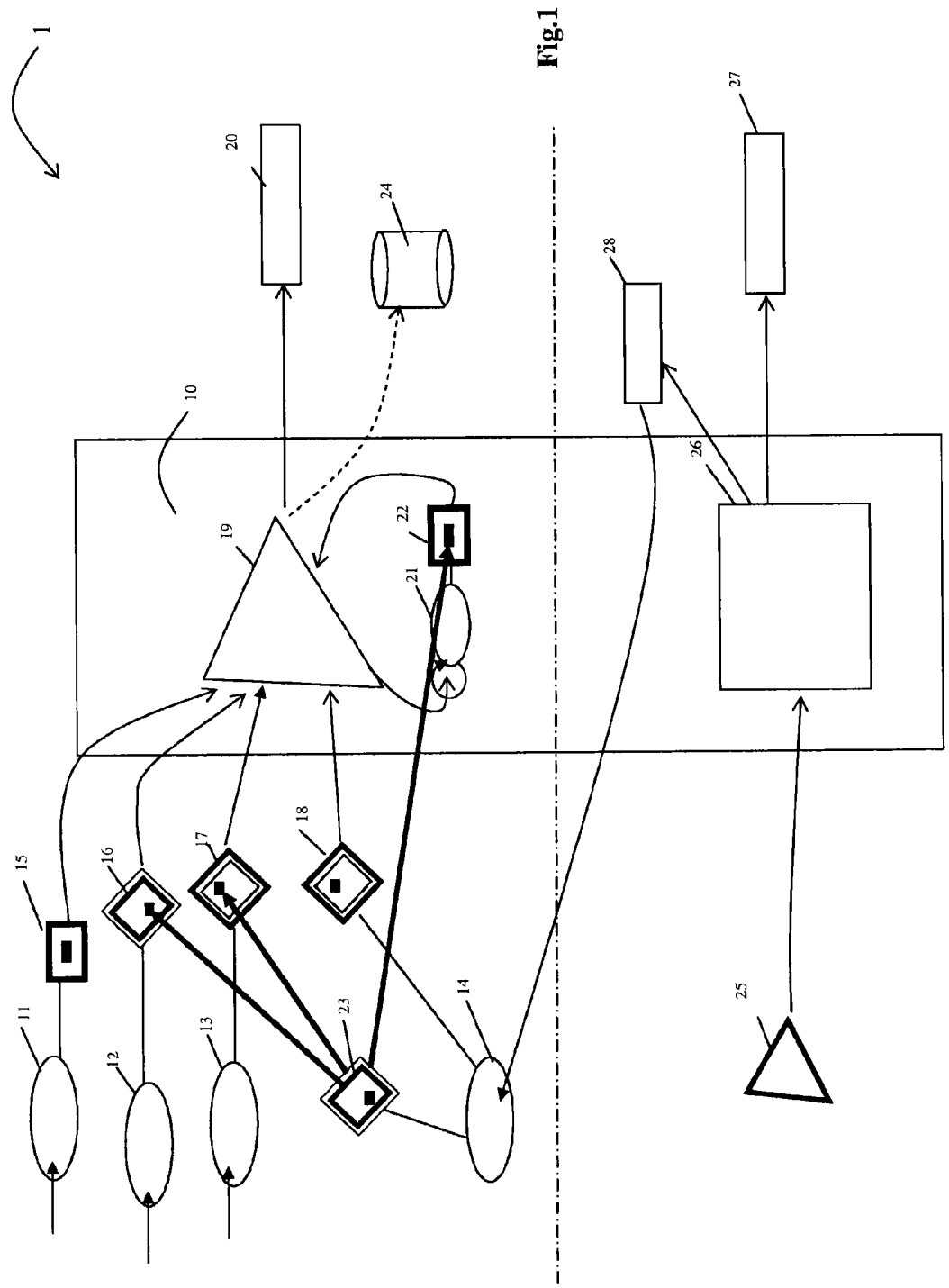
FIG. 1 is a schematic view representing the concept of operation of the stop-start system according to the invention.

According to FIG. 1, the automatic stop-start system 1 comprises an electronic control unit represented by the element 10. In this figure, the "top" portion situated above the dot-and-dash line relates to the conditions to be satisfied for the stoppings of the engine, and the "bottom" portion relates to the automatic engine starting conditions, conditions registered by said system 1. The electronic control unit 10 receives validations of conditions arising from the information originating from the measurement means or sensors represented by the elements from 11 to 13 and then validated in steps 15 to 17. This information is of various types.

It is firstly status values read by the sensors 11 and compared in step 15 (which corresponds to a logical "EQUALS"). These status values are, amongst the conditions included in the above list, the position of the gear lever or the position of the clutch pedal. For example, a sensor 11 must read that "neutral" is engaged for a vehicle with a manual gearbox. To do this, the sensor 11 reads the position of the gear lever which is compared, in step 15, with the "neutral" position. In the event of validation, a signal is sent to the electronic control unit 10 in step 19.

It is secondly values which must remain below thresholds. In the list of the above conditions, these values relate for example to the speed of the vehicle which must be below 4 km/h. In this case, a vehicle-speed sensor 12 reads a vehicle speed which is then compared with the threshold of 4 km/h in step 16 (which corresponds to a logical "LESS THAN"). In the event of validation, a signal is sent to the electronic control unit 10 in step 19.

Other data must exceed a threshold to validate the condition. In the list of the above conditions, these data relate for example to the engine temperature, evaluated with the temperature of the water circulating in said engine, which must be above 40° C. In this case, a temperature sensor 13 in the engine-water circuit reads a value which is compared with the threshold of 40° C. in step 17 (which corresponds to a logical "GREATER THAN"). If the condition is validated, a signal is sent to the electronic control unit 10 in step 19.

The control unit 10 verifies that all the conditions validated from 15 to 17 are brought together in the control step 19 (which corresponds to a logical "AND") before authorizing a stop of the engine, a stop of the engine represented by the action step 20. If one of the conditions from 15 to 17 is not fulfilled, the stop is not authorized and no action is initiated, symbolized by step 24.

According to one embodiment, the electronic control unit may initiate a time delay 21 which verifies that no modification is made to the conditions validated previously for a fixed period before authorizing an automatic stop of the engine. At the end of this time delay, the stop of the engine in step 20 can be commanded. This time delay prevents inappropriate automatic stops of the engine each time the conditions 15 to 17 are brought together even transiently.

According to the invention, the operation of the automatic stop-start system 1 is affected by an internal value which is the counting of the number of operations of said system, this value being managed and saved in step 14. This internal value is subjected to the high threshold by value lower than and compared with this threshold in step 18. Beyond this threshold, no validation signal is sent to step 19 and the stop-start system no longer authorizes the stops of the engine 20, irrespective of the conditions from 15 to 17. The automatic stop-start system is then disabled. The vehicle driver however remains capable of manually stopping the engine and of restarting it manually with the ignition key (not shown). Below this high threshold, the automatic stop-start system 1 is operational and a validation signal is sent to step 19.

In step 26, the automatic stop-start system 1 authorizes (which corresponds to a logical "OR") automatic starts 27 of the engine following an action step 25, starts which follow automatic stops authorized by said system 1. Each automatic start 27 of the engine increments the internal value by means of step 28. This internal value is then saved in step 14 in order to alleviate any electrical or mechanical failure. This value is compared, in addition to the high threshold in step 18, with another threshold in step 23 called the "low" threshold and, when one of the thresholds is reached, the operation of said system 1 is modified for a reduction in the number of operations.

In step 23, on reaching the low threshold, the values of certain thresholds recorded in steps 16 and 17 are modified for the values originating from the measurements of steps 12 to 13 respectively. For example, on reaching the low threshold of use, the engine-water-temperature threshold 13 is read from 40° C. to 80° C. Since the thresholds of steps 12 to 13 are modified, the operation of the automatic stop-start system is also altered. The number of stops of the engine initiated by said system 1 is then substantially reduced, which also reduces the actions on the engine starting system (not shown) and extends its period of operation.

Thus, this condition internal to the automatic engine stop-start system 1 has two effects depending on the threshold values reached: on reaching the low threshold, the operation of said system 1 is reduced, on reaching the high threshold, said system 1 is disabled. This substantially reduces the risks of early failure of the engine starting system. The manual control of the starting system remains effective at all times.

Figure 2:
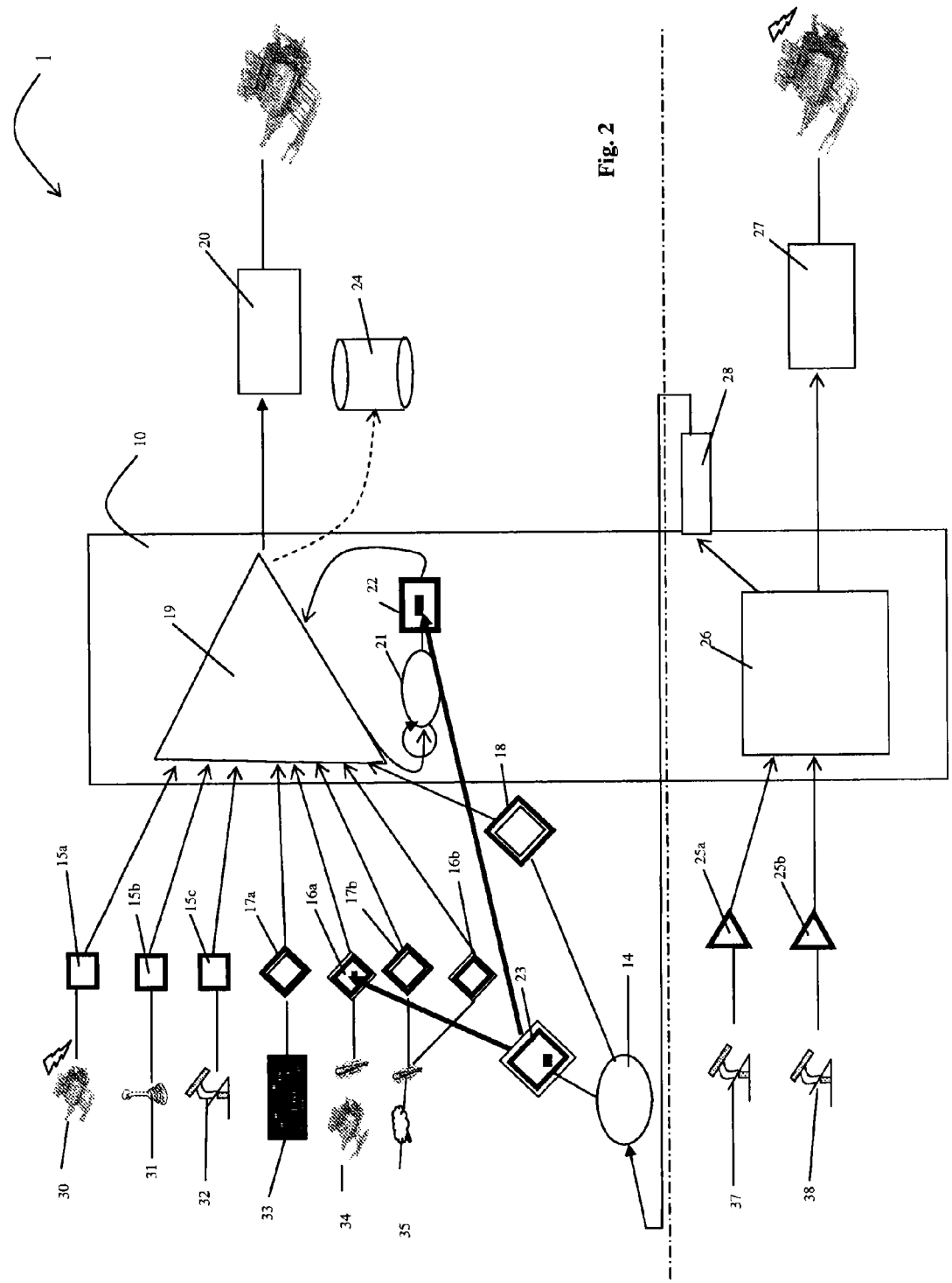
FIG. 2 is a schematic view representing the operating conditions of the stop-start system.

FIG. 2 illustrates the operation of the automatic stop-start system with measurements specified according to a preferred embodiment.

The automatic engine stop-start system 1 according to the invention may comprise:
- an engine-operation sensor 30,
- a gear-lever-position sensor 31,
- a clutch-pedal-position sensor 32,
- a vehicle-speed sensor 33,
- an electronic control unit 10,
- a device 14 for counting the operations of said system,
- an outside-temperature sensor 35, and
- a time-delay element 21.

The automatic engine stop-start system may authorize a stopping when the vehicle is stopped with an engine running.

The engine must be started and a first sensor 30 reads the state of the engine. This state is compared in a step 15*a* and if the engine is running, a signal is sent to the electronic control unit 10 constituting an input datum of step 19. Otherwise, no signal is sent.

In order to specify that the vehicle has stopped, several sensors are used:
- a second sensor 31 for reading the value of the gear ratio engaged. This value is compared in step 15*b* with the "neutral" for vehicles with a manual gearbox or the "neutral point" for vehicles with an automatic gearbox. If the value matches the "neutral" or the "neutral point", a signal is sent to the electronic control unit 10 constituting an input datum of step 19. Otherwise, no signal is sent.
- a third sensor 32 is positioned on the clutch pedal in the case of vehicles with a manual gearbox. Said pedal must be released signifying an "engaged" position. If the "engaged" position is validated in a step 15*c*, a signal is sent to the electronic control unit constituting an input datum of step 19. Otherwise, no signal is sent.
- a fourth sensor 33 reads the vehicle speed. Said speed must be below a maximum threshold which is 4 km/h in this example, the stopped vehicle being able to substantially move depending, for example, on the profile of the road, and it is compared, in step 17*a*, with the maximum threshold of 4 km/h. If the speed value is validated, a signal is sent to the electronic control unit 10 constituting an input datum of step 19. Otherwise, no signal is sent.

The automatic stop-start system 1 also takes account of the temperature of the engine via the temperature of water circulating in said engine. This temperature must be above a threshold so as not to impact the reliability of said engine following many stops and starts. The minimum threshold value for the temperature of the engine is 40° C. A temperature probe 34 reads the engine-water temperature and this temperature is compared with its minimum threshold in step 16. If the temperature read is markedly above 40° C., a signal is sent to the electronic control unit 10 constituting an input datum of step 19. Otherwise, no signal is sent.

The conditions described above must be validated before the authorization to stop the engine by the automatic engine stop-start system 1. However, in order to maintain the comfort of the passengers, an additional condition, which may be optional, can be introduced. The main elements of comfort affected by the stopping of the engine are the air conditioning and the heating of the vehicle. Said system 1 then takes account of the ambient temperature conditions outside the vehicle, which temperature must remain within a defined value range.

The outside ambient temperature must on the one hand not be too high because the stopping of the engine also causes the stopping of the air conditioning, and the ambient temperature inside the vehicle can rise to uncomfortable values for the vehicle driver and the passengers. The maximum outside ambient temperature threshold is set at 30° C. An outside temperature sensor reads an outside-air temperature and compares it with its maximum threshold in step 17b. Beneath this outside-temperature threshold, a signal is sent to the electronic control unit constituting an input datum of step 19. Otherwise, no signal is sent.

The outside ambient temperature must on the other hand be above a minimum threshold because stopping the engine also causes the stopping of the vehicle heating, which adversely affects the comfort of the passengers. The outside temperature read by the sensor 35 is also compared with a minimum outside-temperature threshold which is 10° C. in step 16b. If the outside temperature is above 10° C., a signal is sent to the control unit 10 constituting an input datum of step 19. Otherwise, no signal is sent.

If all these conditions 15a, 15b, 15c, 16, 16a, 16b, 17a and 17b are satisfied, step 19 having received all the required validations, the automatic stop-start system authorizes a stopping of the engine. This stopping of the engine is carried out in step 20. If one of the conditions is not fulfilled, the stopping of the engine is not authorized in step 24.

An additional condition is added to all the foregoing conditions originating from measurements and relates to a time-delay element. In this case, the automatic stop-start system authorizes a stopping of the engine only if all the conditions 15a, 15b, 15c, 16, 16a, 16b, 17a and 17b are satisfied and if these conditions remain satisfied during a period of time which is the duration of the time delay, of the order of 5 seconds. This time delay is represented in step 21. If, for example, in the meantime, the accelerator pedal is pressed, the automatic stopping of the engine will not be authorized.

The automatic engine stop-start system 1 manages the automatic stops of the engine but also the starts of said engine following an automatic stop. Thus, following the stopping of the engine authorized by said system 1, a press on the clutch pedal 37 or the accelerator 38, validated respectively in steps 25a and 25b, actuates the restarting of the engine in step 26 by the control unit 10. The latter executes a verification step of the starting system and commands an instruction 27 to start the engine. In parallel, the control unit increments the counter of the number of operations of the automatic stop-start system 1 in step 28. The value of the number of operations is saved in step 14.

The value of the number of operations of the system 1 is compared with the low-threshold and high-threshold values set for a maximum number of operations of the system 1 respectively in steps 23 and 18:

Below the low threshold, the automatic stop-start system 1 authorizes a stopping of the engine if all the conditions in steps 15a, 15b, 15c, 16a, 16b, 17a, 15 to 17 for the measurements from 30 to 36 are validated.

Beyond the high threshold, no stopping of the engine is authorized by the automatic stop-start system 1 and said system 1 is then disabled. A signal is then sent to invite the vehicle driver to have system 1 checked. The vehicle driver however remains capable of stopping and starting the engine manually with the ignition key. The potential number of starts of the engine in manual operation with the ignition key remains sufficient to ensure the longevity of operation of the engine starting system. This point reduces the risk of immobilizing failures due to the automatic stop-start system.

Between the low and high thresholds of the number of operations of the system 1, the value of the engine-temperature threshold is raised from 40° C. to 80° C. This modification has the effect of spacing out the automatic stopping actuations and hence automatic starting actuations of the engine. The automatic stop-start system 1 is still operating but in a reduced mode. The engine starting system is actuated less, which improves the longevity of the automatic stop-start system 1. The duration of the time delay may also be increased, going from 5 s to 10 s, which may also cause a reduction in the stoppings of the engine due to the automatic stop-start system 1. Similarly, it is possible to modify the speed threshold in step 17a from 4 km/h to 2 km/h or the temperature range of the comfort mode moving from 10° C.-30° C. to 15° C.-25° C. to reduce the number of stops. It is also possible to define intermediate thresholds between the low and high thresholds; when these thresholds are reached, the modifications set out above as an example are carried out in cascade.

Automatic stop-start systems are a means of reducing carbon monoxide emissions and of reducing consumption. They act more on the starting systems and they can therefore more quickly reach their mechanical limits before the service lifetime of the engine, causing risks of non-restarts of the vehicle and hence immobilizing failures. In this instance, the invention presented here alleviates this drawback by reducing the frequency of uses of the automatic stop-start system on reaching a first low threshold depending on the number of operations of the system, up to the total disabling of the system on reaching the high threshold in order to make more reliable the starting of the engine for the vehicle driver, the vehicle driver may nevertheless stop and start the engine manually for the several thousands of starts that remain possible.

The object of obtaining a pertinent use of the automatic engine stop-start system is achieved by modulating the operating conditions of said system according to the number of operations of the automatic engine stop-start system. The invention is not limited to counting the automatic starts of the engine by the automatic engine stop-start system with the definitions of two threshold values as in the example explained above.

Other counts can be taken into account, such as for example the counts of all the automatic starts initiated by said system 1 and manual starts initiated by the vehicle driver with the ignition key or the counts of authorized automatic stops. Moreover, other threshold values may be defined, for example, in order to increase the periods of time delay between two automatic engine stops, which reduces the numbers of engine stops and consequently the actions on the system for starting said engine, or to give information to the vehicle driver for a revision of the starting system.

The invention claimed is:

1. A method for operating an automatic engine stop-start system implemented in a motor vehicle fitted with an internal combustion engine, the internal combustion engine automatically stopping when a set of first conditions that include factors that are external and internal to the vehicle are satisfied and automatically starting following an automatic stop when at least one second condition of action on the engine is satisfied, the method comprising:
modifying at least one of the first conditions that include factors that are external and internal to the vehicle when an internal value reaches a first threshold and when the internal value reaches a second higher threshold, the internal value being a counting of a number of operations of the system.

2. The method as claimed in claim 1, wherein the internal value is incremented on each automatic start of the engine by the system.

3. The method as claimed in claim 2, wherein the system is inhibited when the second higher threshold is exceeded by the internal value.

4. An automatic stop-start system for an internal combustion engine implemented in a motor vehicle fitted with the internal combustion engine, comprising:
an engine-operation sensor;
a gear-lever position sensor;
a clutch-pedal position sensor;
a vehicle-speed sensor;
circuitry configured to
collect information given by the sensors,
authorize an operation of the automatic stop-start system when the engine-operation sensor detects an operation of the engine, the gear-lever position sensor or the clutch-pedal position sensor detects that a transmission of the motor vehicle is in neutral, and the vehicle-speed sensor detects that a speed of the vehicle remains below a speed threshold,
count start operations of the system, and
modify operation of the automatic start-stop system when a counted number of start operations of the system reaches a first threshold and when the counted number of start operations of the system reaches a second higher threshold.

5. The automatic stop-start system as claimed in claim 4, further comprising an external temperature sensor,
wherein the circuitry is further configured to authorize an operation of the automatic stop-start system when the external temperature sensor reads an outside temperature within in a defined range,
wherein the temperature range is modified when the counted number of start operations of the system reaches the first threshold.

6. The automatic stop-start system as claimed in claim 5, further comprising an engine-water-temperature sensor,
wherein the circuitry is further configured to authorize an operation of the automatic stop-start system when the engine-water-temperature sensor reads an engine-water temperature greater than a defined threshold value,
wherein the circuitry increases the engine-water-temperature threshold value when the counted number of start operations of the system reaches the first threshold.

7. The automatic stop-start system as claimed in claim 4, further comprising a time-delay element,
wherein the circuitry increases a time delay of the time-delay element when the counted number of start operations of the system reaches the first threshold.

8. The automatic stop-start system as claimed in claim 4, wherein the circuitry is further configured to modify a vehicle-speed threshold to authorize an operation of the system when the counted number of start operations of the system reaches the first threshold.

9. The automatic stop-start system as claimed in claim 4, wherein the circuitry is further configured to inhibit an operation of the automatic stop-start system when the counted number of start operations of the system reaches the second higher threshold.

10. An automatic engine stop-start system implemented in a motor vehicle fitted with an internal combustion engine, the internal combustion engine automatically stopping when a set of first conditions that include factors that are external and internal to the vehicle are satisfied and automatically starting following an automatic stop when at least one second condition of action on the engine is satisfied, comprising:
circuitry configured to
modify at least one of the first conditions that include factors that are external and internal to the vehicle when an internal value reaches a first threshold and when the internal value reaches a second higher threshold, the internal value being a counting of a number of operations of the system.

* * * * *